(12) United States Patent
Okuma et al.

(10) Patent No.: US 7,730,987 B2
(45) Date of Patent: Jun. 8, 2010

(54) MOTORCYCLE

(75) Inventors: Takanori Okuma, Saitama (JP);
Shinichi Kokubu, Saitama (JP); Masato Nakata, Saitama (JP); Takeo Yokoyama, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 529 days.

(21) Appl. No.: 11/710,536

(22) Filed: Feb. 26, 2007

(65) Prior Publication Data
US 2007/0199754 A1 Aug. 30, 2007

(30) Foreign Application Priority Data
Feb. 28, 2006 (JP) ............................. 2006-053968

(51) Int. Cl.
*B62D 21/00* (2006.01)

(52) U.S. Cl. ....................................... 180/219

(58) Field of Classification Search .................. 180/219, 180/225, 296, 89.2, 309
See application file for complete search history.

(56) References Cited

FOREIGN PATENT DOCUMENTS

| JP | 2003-291873 A | 10/2003 |
|---|---|---|
| JP | 2003291873 | * 10/2003 |

* cited by examiner

*Primary Examiner*—Lesley Morris
*Assistant Examiner*—Levon Fiore
(74) *Attorney, Agent, or Firm*—Birch, Stewart, Kolasch & Birch LLP

(57) ABSTRACT

A motorcycle is provided having an engine disposed between a front wheel and a rear wheel and functional components, e.g., a first radiator, a fuel pump, a rear shock absorber, etc., are arranged, as viewed from the side, on a circumference of a circle with a radius R corresponding to a distance from a crankshaft, serving as a center, to a corner of an oil pan, serving as a part of the engine most distant from the crankshaft, to concentrate the functional components of the motorcycle at positions substantially equidistant from the crankshaft of the engine whereby a mass concentration toward the vehicle body center of a motorcycle is achieved.

20 Claims, 8 Drawing Sheets

MOTORCYCLE

CROSS-REFERENCE TO RELATED APPLICATIONS

The present application claims priority under 35 USC 119 to Japanese Patent Application No. 2006-053968 filed on Feb. 28, 2006 the entire contents of which are hereby incorporated by reference.

BACKGROUND OF THE INVENTION

1. Field of the Invention

The present invention relates to an improvement in a motorcycle.

2. Description of Background Art

A motorcycle is known which includes a radiator arranged in front of an engine and with a battery arranged between the radiator and the engine. See, for example, JP-A NO. 2003-291873.

As shown in FIG. 1 of JP-A NO. 2003-291873, a motorcycle 10 is a vehicle with a V-type engine 13 arranged between a front wheel 42 and a rear wheel 17. A radiator 48 is arranged between the front wheel 42 and the engine 13. A battery 51 is arranged behind the radiator 48 and in front of an oil pan 52 of the engine 13. Exhaust pipes 23 to 25 extend rearwardly from the front part of a cylinder head 21 and are provided at a cylinder part at the front side of the engine 13. The exhaust pipes are collected together and then connected to a right muffler 26. Exhaust pipes 31 and 32 extend rearwardly from a cylinder head 28 provided at a cylinder part at the rear side of the engine 13. The exhaust pipes are collected together to connect to a center muffler 33. A fuel tank 35 is provided with a built-in fuel pump 36 arranged at the upper back of the engine 13. A rear shock absorber 16 is arranged behind the engine 13.

For example, for a sports vehicle for use in races or the like, it has been desired, for the purpose of improving the operating performance such as the turning performance or the like, that the arrangement of functional components such as the radiator 48, battery 51, exhaust pipes 23 to 25, 31, and 32, fuel pump 36, rear shock absorber 16 and the like described above should be positioned so as to achieve further a mass concentration toward the vehicle body center.

SUMMARY AND OBJECTS OF THE INVENTION

It is an object of the present invention to achieve a mass concentration toward the vehicle body center of a motorcycle.

According to an embodiment of the present invention, there is provided a motorcycle including an engine arranged between front and rear wheels, wherein a plurality of functional components are positioned, as viewed from the side, on a circumference with a radius corresponding to a distance from a crankshaft, serving as a center, to a part most distant from the engine.

The effect of this is that the functional components of the motorcycle are concentrated at, as viewed from the side, positions substantially equidistant from the crankshaft of the engine.

According to an embodiment of the present invention, the functional components are a radiator, a fuel pump, and a rear wheel shock absorber.

The effect of this is that the radiator, the fuel pump, and the rear wheel shock absorber as the functional components, which are large in weight, are arrayed on the circumference with a radius corresponding to the distance from the crankshaft, serving as a center, to the part most distant from the engine, thus enhancing the effect of the mass concentration.

According to an embodiment of the present invention, a voltage-current adjusting regulator and a battery are arranged inside the circumference.

The effect of this is that the regulator is located closer to the engine, thus shortening a conducting wire when connecting together an AC generator annexed to the engine and the voltage-current adjusting regulator.

In addition, the battery is located closer to the engine, thus enhancing the effect of the mass concentration.

According to an embodiment of the present invention, a discharge port of an exhaust pipe is provided on the circumference.

The effect of this is that the discharge port at the distal end of the exhaust pipe is located on the circumference, which locates a large portion of the large-weight exhaust pipe inside the circumference, thus enhancing the effect of the mass concentration.

According to an embodiment of the present invention, the longitudinal directions of at least one of the plurality of functional components, the regulator, and/or the battery extend substantially along the circumference.

The effect of this is that, for example, even when the functional components, the regulator, and/or the battery are arranged on the circumference, if the longitudinal directions of the functional components, the regulator, and/ or the battery extend radially, the functional components, the regulator, and/or the battery are arranged at positions separated from the circumference. Thus a weakening the effect of the mass concentration occurs. However, in the present invention, the functional components, the regulator, and/or the battery can be arranged on the circumference or at positions closer to the circumference. Thus an enhancing of the effect of the mass concentration occurs.

According to an embodiment of the present invention, the engine is of a V-type.

The effect of this is that arranging the functional components including the regulator and the battery in such a manner as to surround the V-type engine permits providing a favorable weight balance and also achieving a mass concentration.

According to an embodiment of the present invention, a plurality of functional components are arranged, as viewed from the side, on the circumference with a radius corresponding to a distance from a crankshaft, serving as a center, to a part most distant from the engine. Thus, the mass can be concentrated near the engine arranged at substantially the vehicle body center, thus permitting an improved traveling performance of a motorcycle, such as, for example, an improved turning performance or the like.

According to an embodiment of the present invention, the functional components are a radiator, a fuel pump, and a rear wheel shock absorber. Thus, arranging the radiator, the fuel pump, and the rear wheel shock absorber, which are large in weight, on the circumference can enhance the effect of the mass concentration.

According to an embodiment of the present invention, a voltage-current adjusting regulator and a battery are arranged inside the circumference. Thus, a distance between an AC generator annexed to the engine and the regulator can be shortened, and a conducting wire connecting together the AC generator and the regulator can be shortened, thus achieving a savings in the weight. In addition, the battery is located closer to the engine, thus permitting an enhancing of the effect of mass concentration.

According to an embodiment of the present invention, a discharge port of an exhaust pipe is provided on the circumference. Thus, a large portion of the exhaust pipe, which is large in weight, can be arranged inside the circumference, thus effectively performing a mass concentration toward the vehicle body center.

According to an embodiment of the present invention, longitudinal directions of at least one of the plurality of functional components, the regulator, and/or the battery extend substantially along the circumference. Thus, the substantially entire functional components, regulator, and/or battery can be arranged on the circumference or at position closer to the circumference, thus facilitating a mass concentration toward the vehicle body center.

According to an embodiment of the present invention, the engine is of a V-type. Thus favorable weight balance can be provided and also mass concentration can be performed.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
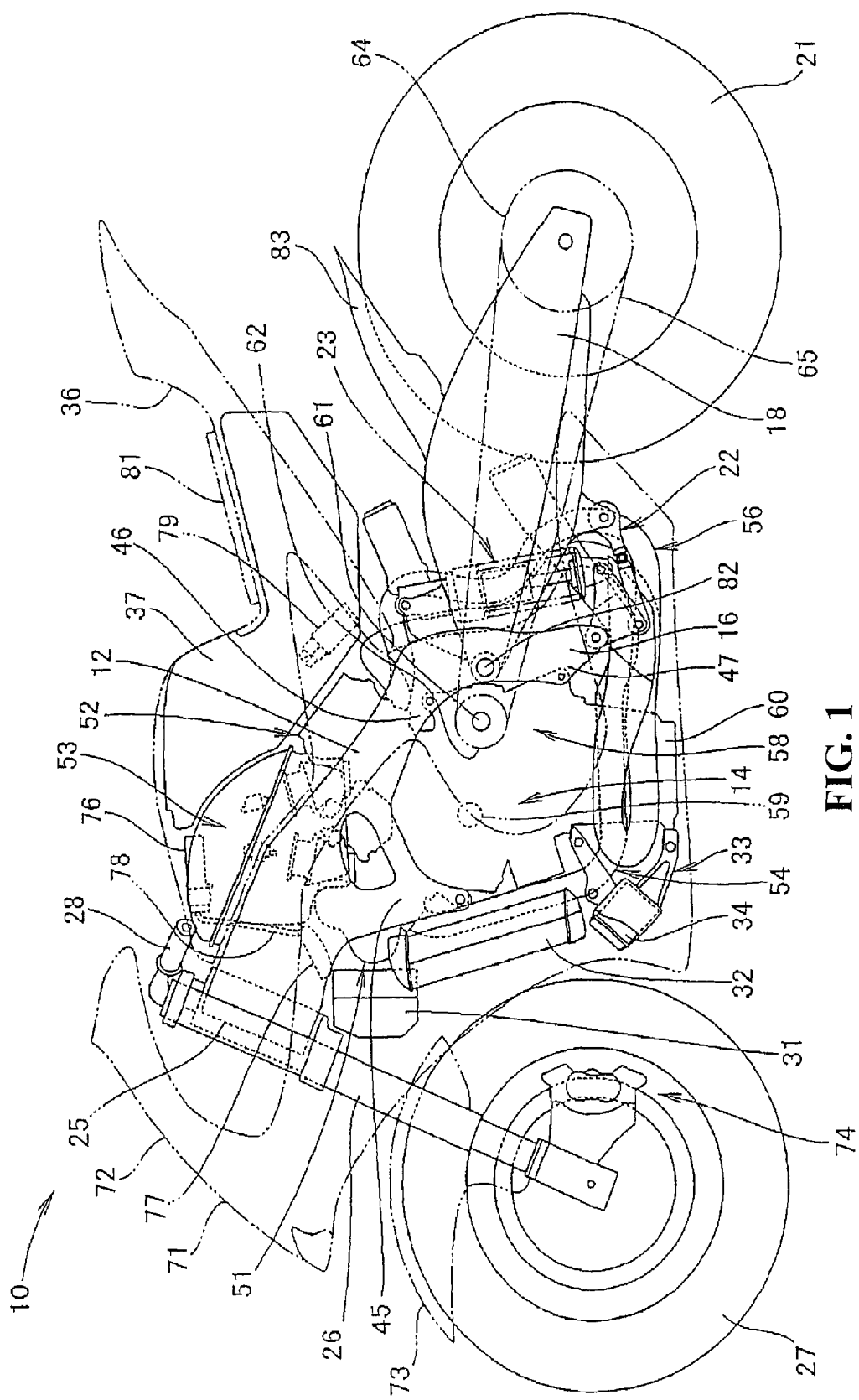
FIG. 1 is a side view of a motorcycle according to the present invention.

Hereinafter, the best mode for carrying out the invention will be described with reference to the accompanying drawings. The drawings are to be viewed along the direction of the reference numerals.

FIG. 1 is a side view of a motorcycle according to the present invention. A motorcycle 10 is a vehicle that includes a pair of right and left mainframes 12 and 13 (only reference numeral 12 on the near side is shown). A V-type engine 14 is fitted below the mainframes 12 and 13. A swing arm 18 is vertically swingably fitted to pivot plate parts 16 and 17 (only reference numeral 16 on the near side is shown) forming the lower back parts of the mainframes 12 and 13. A rear wheel 21 is fitted to the rear end of the swing arm 18. A rear shock absorber 23 includes one end thereof fitted to the upper front part of the swing arm 18 and the other end thereof fitted to the lower ends of the pivot plate parts 16 and 17 via a link mechanism 22. A front fork 26 is steerably fitted to a head pipe 25 fitted to the front ends of the mainframes 12 and 13 with a front wheel 27 being fitted to the lower end of this front fork 26. A handlebar 28 is fitted to the upper end of the front fork 26. A first radiator 31 and a second radiator 32 are arranged in front of the engine 14 with a battery 34 being fitted to the lower front of the engine 14 via a support member 33. A fuel tank 37 is fitted above the mainframes 12 and 13 via a seat cowl 36.

The mainframes 12 and 13 are provided with an engine hanger 45 supporting the front part of the engine 14, and engine support parts 46 and 47 supporting the back part of the engine 14.

The engine 14 is provided with a front cylinder part 51 and a rear cylinder part 52 provided at the upper part thereof. A suction system 53 is fitted between the front cylinder part 51 and rear cylinder part 52. A front exhaust system 54 is fitted to the front part of the front cylinder part 51 with a rear exhaust system 56 being fitted to the rear part of the rear cylinder part 52. A transmission 58 is integrally fitted at the back part thereof. A crankshaft 59 of the engine 14 is provided together with an oil pan 60 at the lower end part of the engine 14.

The transmission 58 is provided with an output shaft 61 projecting to the side and a drive sprocket 62 fitted to this output shaft 61.

The rear wheel 21 is integrally provided with a driven sprocket 64. A chain 65 is hooked over the drive sprocket 62 and the driven sprocket 64 described above.

A cowling 71 is provided with a windscreen 72, a front fender 73, a front wheel disc brake 74 and an engine control unit 76 arranged above the mainframes 12 and 13 and in front of the fuel tank 37. A voltage-current adjusting regulator 77 is connected to the engine control unit 76 via a wire harness 78. A fuel pump 79 is provided in the fuel tank 37. A seat 81 is fitted to the seat cowl 36 with a pivot shaft 82 provided at the pivot plate parts 16 and 17 to fit the swing arm 18 swingably. A rear fender 83 is mounted on the vehicle frame.

Figure 2:
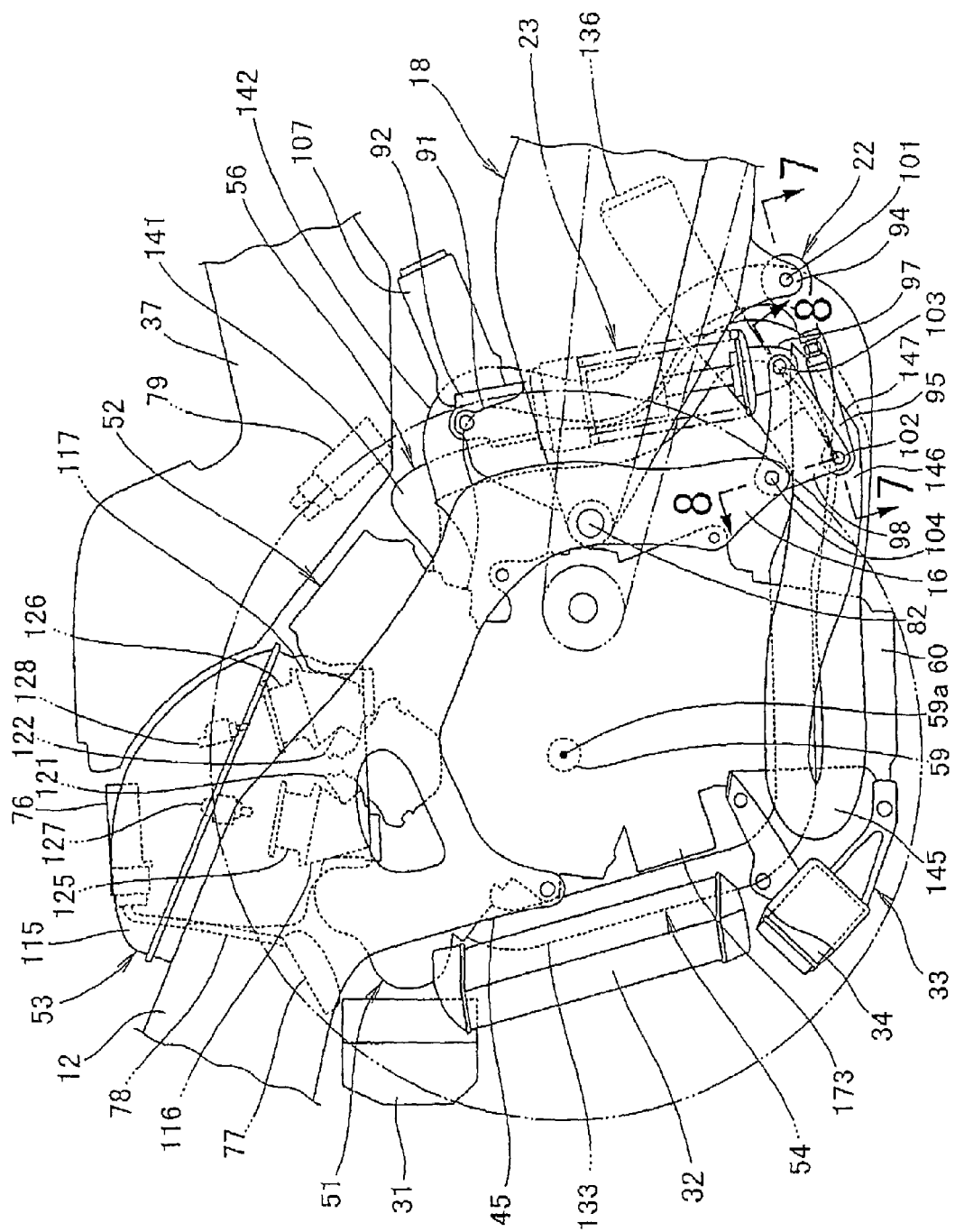
FIG. 2 is a side view of major parts of the motorcycle according to the present invention.

FIG. 2 is a side view of main parts of the motorcycle according to the present invention. The swing arm 18 has a shock absorber upper end fitting part 91 provided at the upper front part thereof, and has an upper end part 92 of the rear shock absorber 23 fitted to this shock absorber upper end fitting part 91.

The link mechanism 22 includes a first link 95 having one end thereof swingably coupled to lower projections 94 and 94 provided at the lower part of the swing arm 18 (only reference numeral 94 on the near side is shown). A second link 98 of a triangular shape includes one end thereof fitted to the other end of this first link 95 and having the other two end parts thereof swingably coupled to a lower end part 97 of the rear shock absorber 23 and the lower ends of the pivot plate parts 16 and 17 (only reference numeral 16 on the near side is shown), respectively. An axis 59a of a crankshaft 59 is provided together with coupling shafts 101 to 104 of the link mechanism 22. A reservoir 107 reserves a hydraulic fluid for use in the rear shock absorber 23.

The suction system 53 includes a suction box 115 fitted to the front cylinder part 51 and the rear cylinder part 52 with throttle bodies 116 and 117 arranged inside this suction box 115 and also fitted to the front cylinder part 51 and the rear cylinder part 52, respectively. Fuel injection valves 121 and 122 are fitted to the throttle bodies 116 and 117, respectively. Air funnels 125 and 126 are fitted to the throttle bodies 116 and 117, respectively with fuel injection valves 127 and 128 arranged substantially above the air funnels 125 and 126 to inject a fuel to openings of the air funnels 125 and 126.

Figure 3:
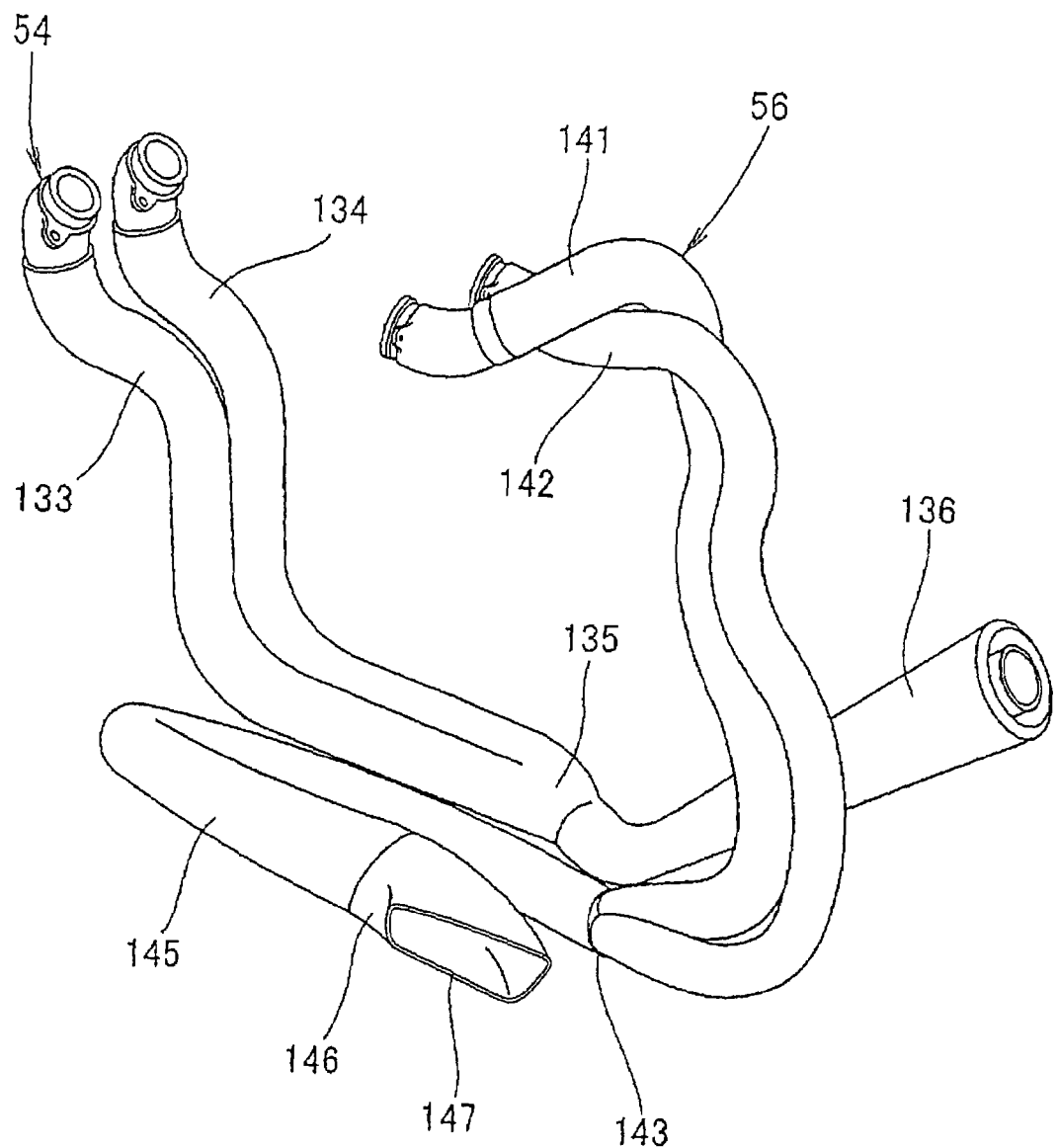
FIG. 3 is a perspective view showing a front exhaust system and a rear exhaust system according to the present invention.

FIG. 3 is a perspective view showing the front exhaust system and the rear exhaust system according to the present invention. The front exhaust system 54 includes exhaust pipes 133 and 134 fitted to the front cylinder part 51(see FIG. 2) with a muffler 136 fitted to a manifold 135 to which the exhaust pipes 133 and 134 are collected.

The rear exhaust system 56 includes upstream exhaust pipes 141 and 142 fitted to the rear cylinder part 52 (see FIG. 2) with a downstream exhaust pipe 145 of a U-shape fitted to a manifold 143 where the upstream exhaust pipes 141 and 142 are collected together. A discharge pipe 146 is integrally provided at the end part of the downstream exhaust pipe 145. The discharge pipe 146 has at the end part thereof an opening 147 for discharging exhaust gas.

Figure 4:
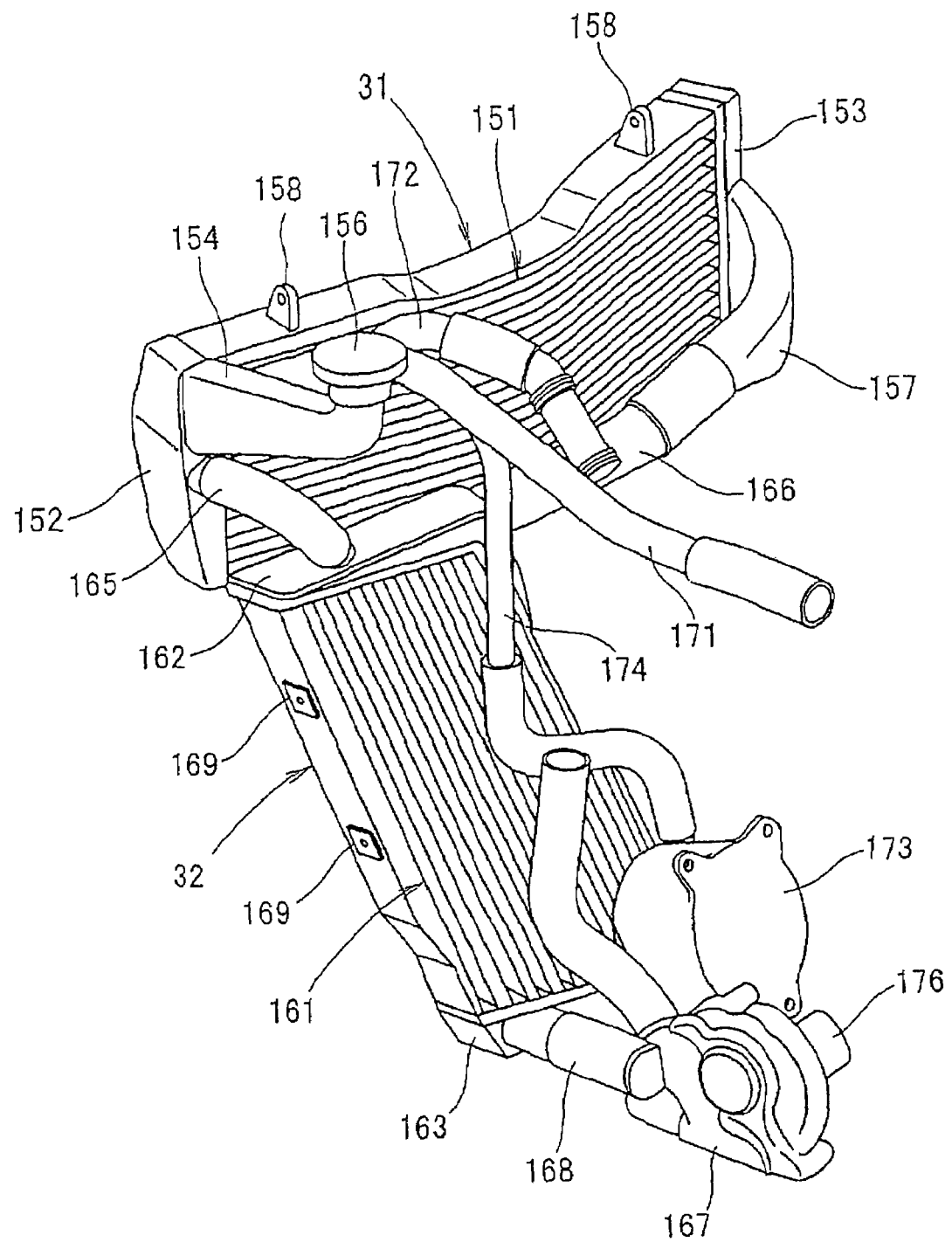
FIG. 4 is a perspective view showing a first radiator and a second radiator according to the present invention.

FIG. 4 is a perspective view showing a first radiator and a second radiator according to the present invention. The first radiator 31 is horizontally long and curved in an anteroposterior direction so that the both end parts thereof are located closer to the vehicle front than the central part thereof, and includes a radiator core 151, side tanks 152 and 153 provided at both ends of this radiator core 151, a radiator liquid filling pipe 154 connected to the side tank 152, a radiator cap 156 fitted to the end part of this radiator liquid filling pipe 154 and a coupling pipe 157 connected to the side tank 153. Fitting parts 158, 158 are provided for fitting the first radiator 31 to the mainframes 12 and 13 (see FIG. 1).

The second radiator 32 is vertically long and arranged at the left rear side of the first radiator 31, and includes a radiator core 161, and an upper tank 162 and a lower tank 163 fitted to the upper part and lower part of the radiator core 161. The second radiator 32 is connected to the first radiator 31 via a first hose 165, connected to the coupling pipe 157 via a second hose 166, and connected to a water pump 167 via a third hose 168. Fitting parts 169, 169 are provided for fitting the second radiator 32 to the engine hanger 45 (see FIG. 2).

In FIG. 4, a fourth hose 171 and a fifth hose 172 connect together the first radiator 31 and the engine 14 (see FIG. 2). An oil cooler 173 is included in the engine 14 with a sixth hose 174 connecting together the first radiator 31 and the oil cooler 173. A connection port 176 is provided at a water pump 167 to connect together the engine 14 and the hose.

Figure 5:
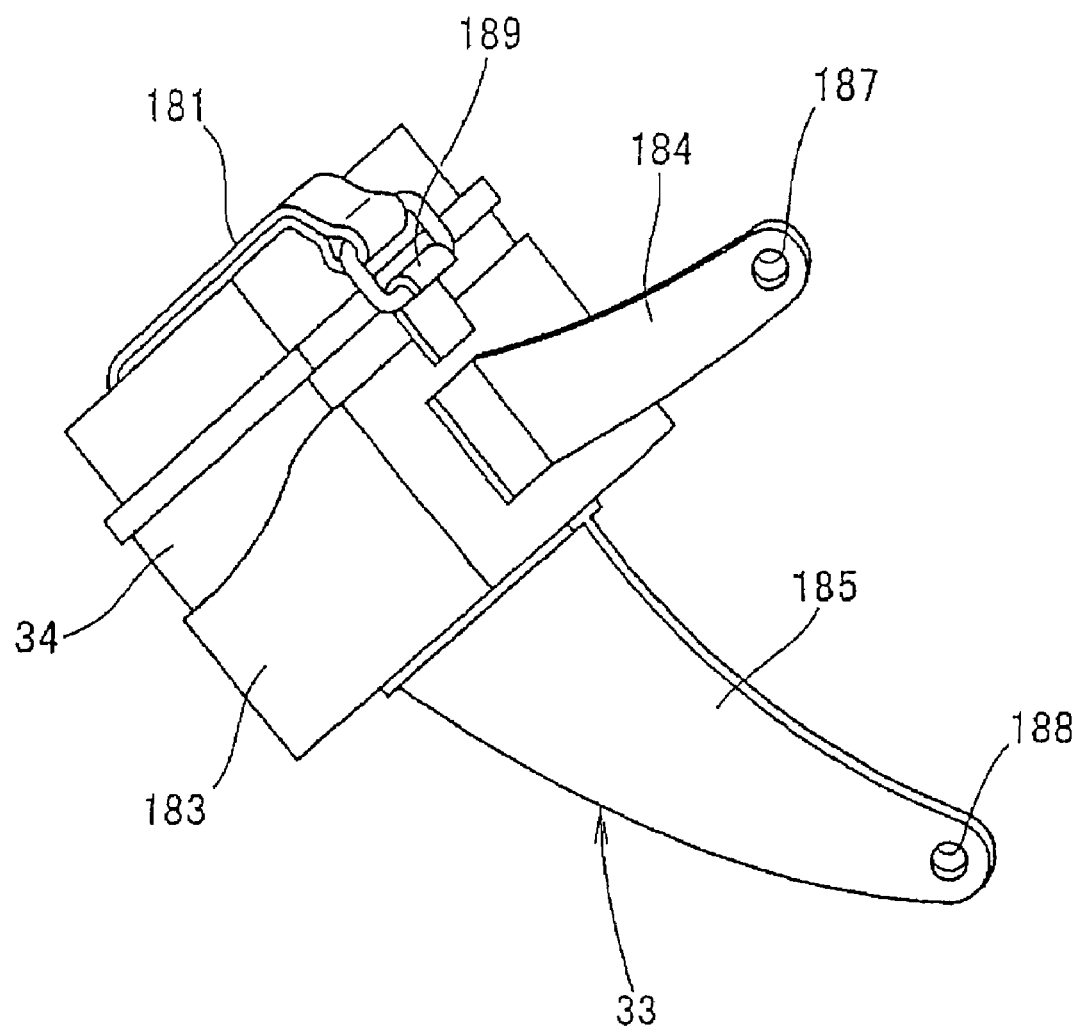
FIG. 5 is a perspective view showing a battery supporting structure according to the present invention.

FIG. 5 is a perspective view showing a battery supporting structure according to the present invention, with the battery 34 supported by the support member 33 and also fixed by stretching a rubber band 181 therearound.

The support member 33 includes a tray 183 where the battery 34 is placed with a first stay member 184 fitted to the side surface of this tray 183 and a second stay member 185 fitted to the bottom surface of the tray 183. Fitting holes 187 and 188 are made in the first stay member 184 and the second stay member 185, respectively, for fitting the support member 33 to the engine 14 (see FIG. 2). Hooks 189, 189 (only one of numerals 189 is shown) are respectively fitted to the both side surfaces of the tray 183 for hooking the rubber band 181 therearound.

Figure 6:
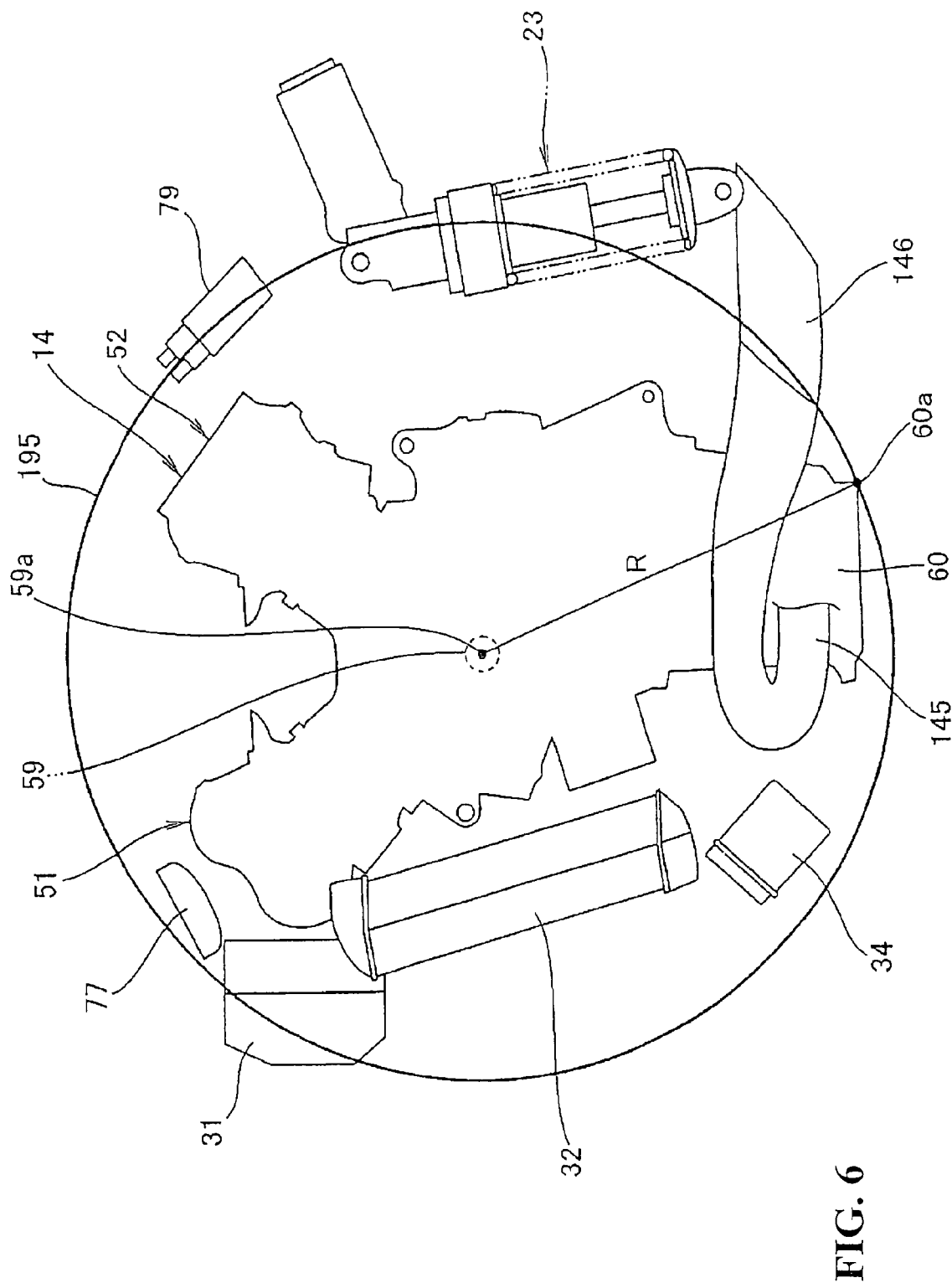
FIG. 6 is an explanatory diagram showing the layout of an engine and functional components according to the present invention.

FIG. 6 is an explanatory diagram showing the layout of the engine and the functional components according to the present invention.

When a circle 195 is drawn, as viewed from the side, with a radius R corresponding to a distance from an axis 59a of the crankshaft 59 of the engine 14, serving as a center, to a part of various parts of the engine 14 most distant from the axis 59a, here, a corner 60a of the oil pan 60 (this position is shown by a point), the rear shock absorber 23, the first radiator 31, the fuel pump 79, and the discharge pipe 146 are located on the circumference of the circle 195, and the second radiator 32, the battery 34, the regulator 77, and the downstream exhaust pipe 145 are located close to and inside the circumference of the circle 195.

The rear shock absorber 23, first radiator 31, second radiator 32, battery 34, regulator 77, fuel pump 79, downstream exhaust pipe 145, and discharge pipe 146 are functional components. The rear shock absorber 23, the first radiator 31, the second radiator 32, the battery 34, the fuel pump 79, the downstream exhaust pipe 145, and the discharge pipe 146 in particular, which are large in weight, are located close to the periphery of the engine 14 to thereby concentrate a mass at the vehicle body center including the engine 14.

Therefore, in FIG. 1, when the motorcycle 10 turns around a corner or the like, the turning performance in which the motorcycle 10 changes its orientation with respect to the vehicle body center as a center improves, thus permitting an improvement in the turning performance.

Further, arranging the battery 34 and the fuel pump 79 at positions substantially point-symmetric to each other with respect to the axis 59a of the crankshaft 59 permits an improvement in vehicle body weight balance.

Further, the longitudinal direction of the rear shock absorber 23, the battery 34, the regulator 77, and the fuel pump 79 extend substantially along the circumference of the circle 195, that is, they extend in a tangential direction of the circle 195, so that each of the functional components does not separate largely from the circumference, thus achieving an effective mass concentration.

As shown in FIGS. 1 and 6 above, the present invention provides the motorcycle 10 with the engine 14 being arranged between the front wheel 27 and the rear wheel 21, the functional components (the first radiator 31, the fuel pump 79, and the rear shock absorber 23) are arranged, as viewed from the side, on the circumference of the circle 95 having the radius R corresponding to the distance from the crankshaft 59, serving as the center, to the corner part 60a of the oil pan 60 as the part most distant from the engine 14.

As a result, a mass can be concentrated near the engine 14 arranged at substantially the vehicle body center, thus permitting an improved traveling performance of the motorcycle 10, such as, for example, the turning performance or the like.

The present invention includes the functional components that are the first radiator 31, the fuel pump 79, and the rear shock absorber 23.

As a result, arranging the first radiator 31, the fuel pump 79, and the rear shock absorber 23, which are large in weight, on the circumference of the circle 195 can enhance the effect of the mass concentration.

Further, the present invention includes the voltage-current adjusting regulator 77 and the battery 34 that are arranged inside the circumference of the circle 195.

As a result, the distance between the AC generator (not shown) annexed to the engine 14 and the regulator 77 can be shortened and a conducting wire connecting together the AC generator and the regulator 77 can be shortened, thus achieving a weight saving. In addition, the battery 34 is located closer to the engine 14, thus enhancing the effect of mass concentration.

Further, the present invention includes the discharge pipe 146 as the discharge port of the downstream exhaust pipe 145 that is provided on the circumference of the circle 195.

As a result, a large portion of the downstream exhaust pipe 145, which is large in weight, can be arranged inside the circumference of the circle 195, thus effectively performing a mass concentration toward the vehicle body center.

Further, the present invention includes in the longitudinal direction of at least one component of the plurality of functional components (the first radiator 31, the fuel pump 79, and the rear shock absorber 23). More specifically, the fuel pump 79 and the rear shock absorber 23, the regulator 77, and/or the battery 34 extend substantially along the circumference of the circle 195.

As a result, substantially the entire functional components (the fuel pump 79 and the rear shock absorber 23), the regulator 77, and/or the battery 34 can be arranged on the circumference of the circle 195 or at position near the circumference, thus facilitating mass concentration toward the vehicle body center.

Further the present invention includes an engine 14 that is of a V-type.

As a result, a favorable weight balance can be provided and mass concentration can be performed.

Figure 7:
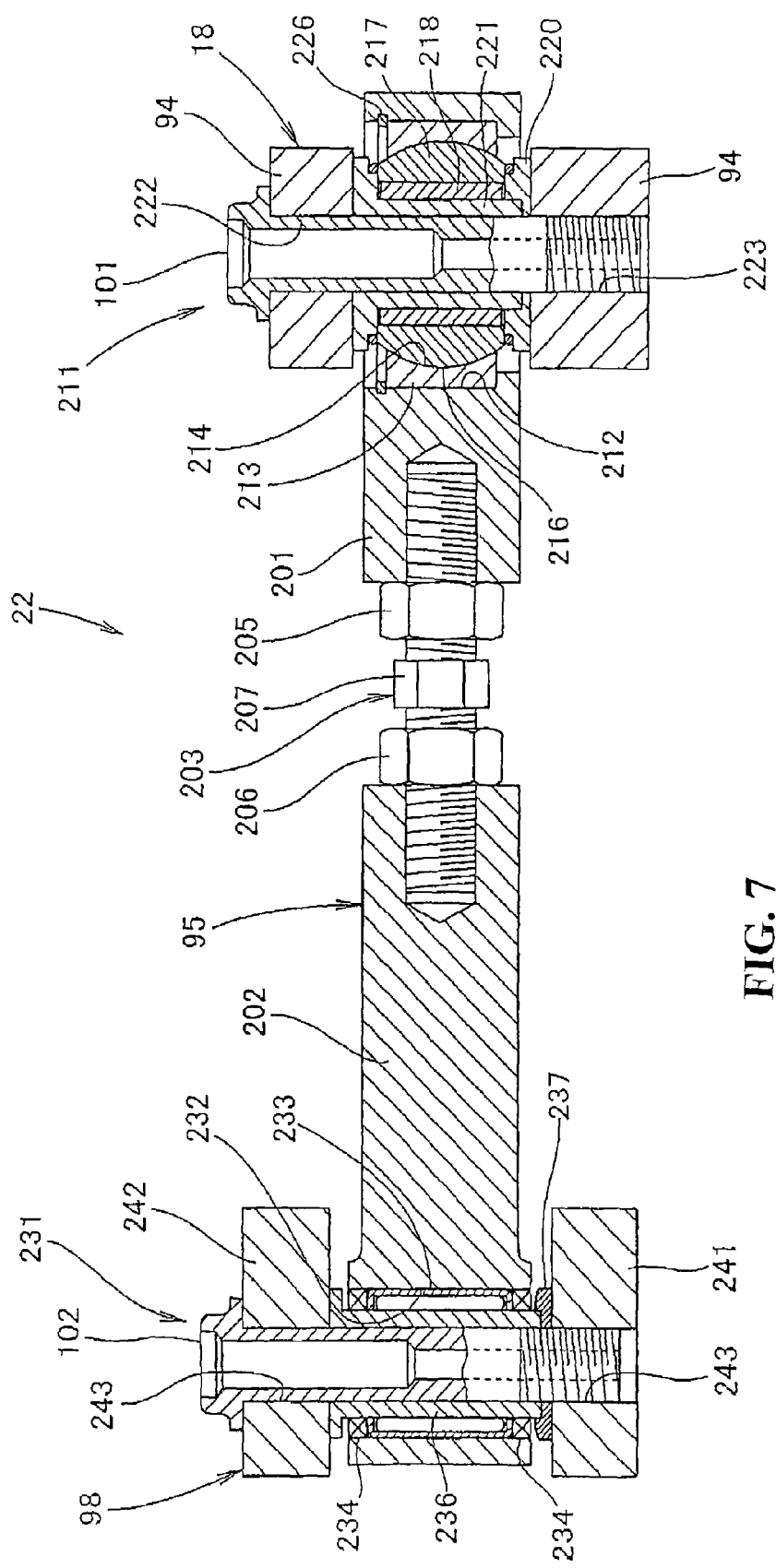
FIG. 7 is a sectional view taken on line 7-7 of FIG. 2.

FIG. 7 is a sectional view taken on line 7-7 of FIG. 2. The first link 95 has a first rod 201 and a second rod 202 coupled together with a bolt 203 and fixed with lock nuts 205 and 206, respectively. A hexagonal part 207 is provided at the center of the bolt 203.

A first coupling section 211 for coupling together the lower projections 94, 94 and the first rod 201 of the swing arm 18 includes a hole 212 formed in the end part of the first rod 201. An outer ring 213 is fitted in the hole 212 with an inner ring 217 provided with a convex spherical surface 216 slidably fitted with a concave spherical surface 214 included in the outer ring 213. A first collar 218 is fitted inside the inner ring 217 with a second collar 221 fitted inside the first collar 218. An end part member 220 is interposed between the end part of the second collar 221 and each one of the lower projections 94. A hollow coupling shaft 101 of a bolt-like shape passes through a shaft inserting hole 222 opened in one of the lower projections 94 and 94 and penetrates inside the second collar 221 with the leading end thereof screwed with a female screw 223 formed at the other lower projection 94. A retaining ring 226 prevents the outer ring 213 from slipping off from the hole 212.

A second coupling part 231 couples together the second rod 202 and the second link 98 and includes a hole 232 formed at the end part of the second rod 202 with a needle bearing 233 fitted in the hole 232 with dust seals 234 and 234 fitted in the hole 232 and also arranged on the both sides of the needle bearing 233. A collar 236 is rotatably fitted with the needle bearing 233 and dust seals 234 and 234. Ring-like plate 237 abut on the end part of the collar 236. A hollow coupling shaft 102 of a bolt-like shape passes through a shaft inserting hole 243 formed in the arm part 242 with one of the arm parts 241 and 242 provided at one end part of the second link 98, penetrating inside the collar 236 and the ring-like plate 237, and screwed with a female screw 243 formed at the other arm part 241.

Figure 8:
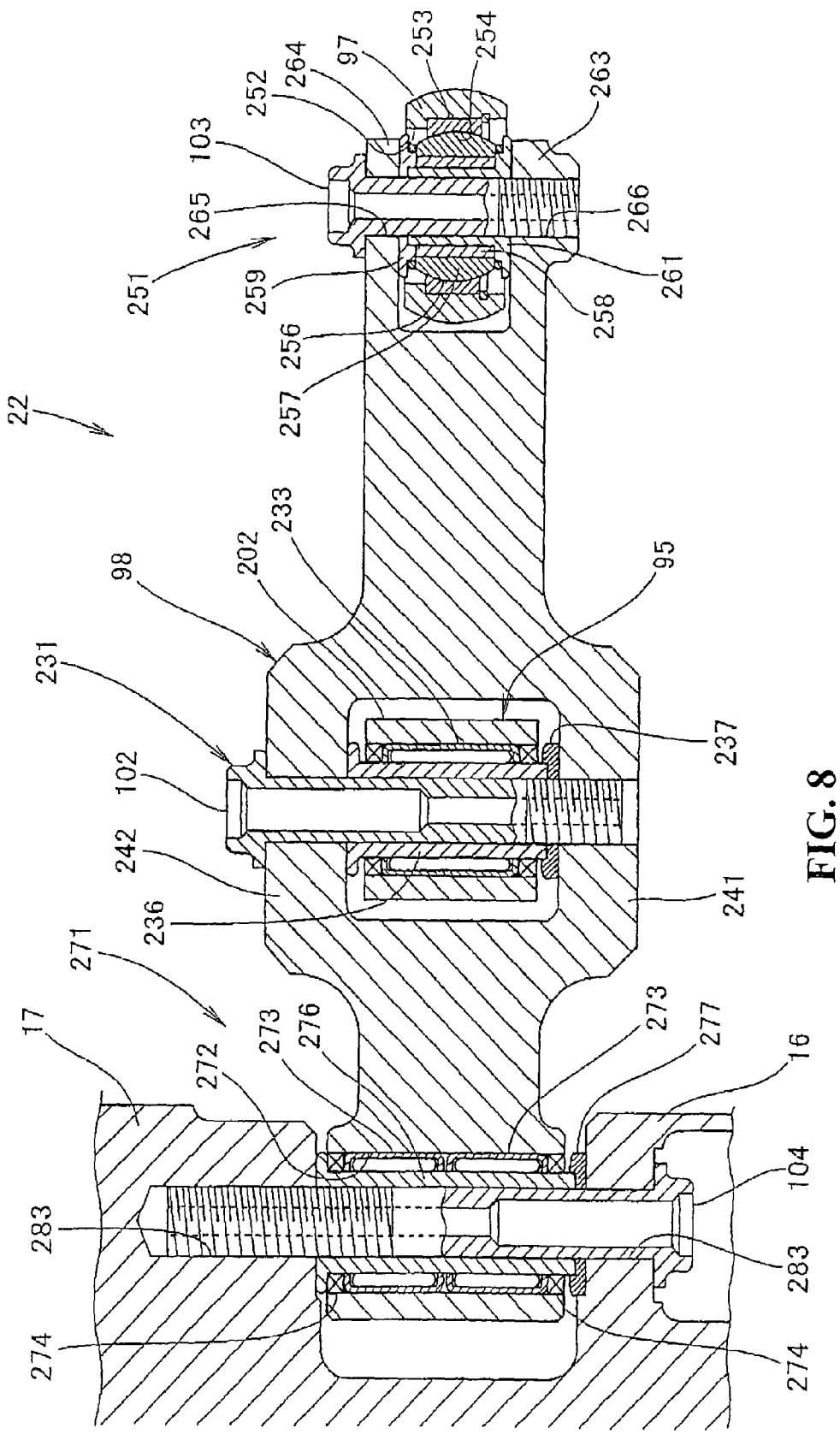
FIG. 8 is a sectional view taken on line 8-8 of FIG. 2.

FIG. 8 is a sectional view taken on line 8-8 of FIG. 2. A third coupling part 251 couples together the lower end part 97 and second link 98 of the rear shock absorber 23 (see FIG. 2). A hole 252 is formed in the lower end part 97 with an outer ring 253 fitted in the hole 252 and an inner ring 257 provided with a convex spherical surface 256 slidably fitted with a concave spherical surface 254 included in the outer ring 253. A first collar 258 is fitted inside the inner ring 257 with a second collar 261 fitted inside the first collar. An end part member 259 is interposed between the end part of the second collar 221 and each arm part 264 to be described later. A hollow coupling shaft 103 of a bolt-like shape passes through a shaft inserting hole 265 formed in an arm part 264 with one of the arm parts 263 and 264 being provided at one end part of the second link 98, penetrating inside the second collar 261, and is screwed with a female screw 266 formed at the other arm part 263.

A fourth coupling part 271 couples together the second link 98 and the pivot plate parts 16 and 17. A hole 272 is formed at the end part of the second link 98 with needle bearings 273 and 273 fitted in the hole 272 with dust seals 274 and 274 fitted in the hole 272 and also arranged on the both sides of the needle bearings 273 and 273. A collar 276 is rotatably fitted with the needle bearings 273 and 273 and the dust seals 274 and 274 with a ring-like plate 277 abutting on the end part of the collar 276. A hollow coupling shaft 104 of a bolt-like shape passes through an inserting hole 283 formed in the pivot plate part 16, penetrating inside the ring-like plate 277 and the collar 276, and is screwed with a female screw 283 formed at the pivot plate part 17.

The link mechanism 22 includes the first link 95 and second link 98 arranged near and outside the circumference of the circle 195 (see FIG. 6) that contributes to mass concentration by achieving a weight saving with the hollow bolt or the like and also provides favorable shock absorption by the rear wheel 21 (see FIG. 1).

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A motorcycle comprising:
   an engine arranged between a front and a rear wheels; and
   a plurality of functional components being arranged, as viewed from the side, on a circumference with a radius corresponding to a distance from a crankshaft of the engine serving as a center, to a part of the engine most distant from the crankshaft.

2. The motorcycle according to claim 1, wherein a voltage-current adjusting regulator and a battery are arranged inside the circumference.

3. The motorcycle according to claim 1, wherein a voltage-current adjusting regulator and a battery are arranged inside the circumference.

4. The motorcycle according to claim 1, wherein a discharge port of an exhaust pipe is provided on the circumference.

5. The motorcycle according to claim 2, wherein a discharge port of an exhaust pipe is provided on the circumference.

6. The motorcycle according to claim 2, wherein the longitudinal directions of at least one of the plurality of functional components, the regulator, and/or the battery extend substantially along the circumference.

7. The motorcycle according to claim 3, wherein the longitudinal directions of at least one of the plurality of functional components, the regulator, and/or the battery extend substantially along the circumference.

8. The motorcycle according to claim 1, wherein the engine is of a V-type.

9. The motorcycle according to claim 1, wherein the engine is of a V-type.

10. The motorcycle according to claim 2, wherein the engine is of a V-type.

11. The motorcycle according to claim 3, wherein the engine is of a V-type.

12. The motorcycle according to claim 4, wherein the engine is of a V-type.

13. A motorcycle comprising:
a frame for supporting a front wheel at a forward position thereof and a rear wheel at a rearward position thereof;
an engine arranged between the front wheel and the rear wheel;
a crankshaft being operatively mounted within said engine;
a circumference being defined by a radius corresponding to a distance from the crankshaft of the engine serving as a center to a part of the engine most distant from the crankshaft, and
a plurality of functional components for the motorcycle being arranged, as viewed from the side, on said circumference.

14. The motorcycle according to claim 13, wherein a voltage-current adjusting regulator and a battery are arranged inside the circumference.

15. The motorcycle according to claim 13, wherein a voltage-current adjusting regulator and a battery are arranged inside the circumference.

16. The motorcycle according to claim 13, wherein a discharge port of an exhaust pipe is provided on the circumference.

17. The motorcycle of claim 1, wherein the functional components further include components disposed substantially along the circumference in the longitudinal direction.

18. The motorcycle of claim 17, wherein the functional components include the rear wheel shock absorber, the battery, the regulator, and the fuel pump, said functional components extending in a tangential direction relative to the circumference.

19. The motorcycle of claim 18, wherein the battery and the fuel pump are disposed at positions substantially point-symmetrical relative to each other and with respect to the axis of the crankshaft of the engine.

20. The motorcycle of claim 1, wherein a first radiator, a fuel pump, a rear shock absorber, and a downstream exhaust pipe are disposed on said circumference, and a second radiator, a regulator, a battery and a downstream exhaust pipe are disposed along the circumference in the longitudinal direction.

* * * * *